United States Patent Office 3,013,873
Patented Dec. 19, 1961

3,013,873
HERBICIDAL METHOD USING 3-NITRO-2,5-DICHLOROBENZOIC ACID
Richard D. Hart, Ambler, and Harvey P. Raman, Philadelphia, Pa., assignors to Amchem Products, Inc., Ambler, Pa., a corporation of Delaware
No Drawing. Filed Nov. 19, 1957, Ser. No. 697,319
2 Claims. (Cl. 71—2.6)

This invention relates to the herbicidal art. The primary object of the invention is to provide herbicidal compositions and process which exhibit an exceptionally high degree of selectivity for undesirable vegetation and noxious weeds without adversely affecting desirable crops.

Another object of the invention is to provide herbicidal compositions and processes which are not only highly selective but effective in both pre- and post-emergence treatments.

Yet another object is to provide a highly selective herbicide which is effective in pre-plant applications prior to seeding.

These objects are attained with an unusual degree of success by the use of 3-nitro 2,5-dichlorobenzoic acid and its functional derivatives. The functional derivatives encompass the salts, amines, amides and esters. Among the salts are the alkali metal salts such as sodium and potassium, and the ammonium salt. Among the amines are monomethyl, diethyl, triethyl, triisopropyl, alkanolamines, etc. Among the esters are methyl, ethyl, propyl, isopropyl, butyl, Carbitols, Cellosolves, such ethyl and butyl Cellosolve, glycol and polyethylene glycol esters, such as the polyglycol monoether of the formula $R(OC_nH_{2n})_m OH$, where R represents an alkyl radical from 1 to 4 carbon atoms inclusive, $n$ is an integer from 2 to 3 inclusive, and $m$ is an integer from 1 to 3 inclusive.

The compounds may be applied to a stand of crops and weeds in the post-emergence treatment and to the ground in the pre-plant or pre-emergence treatment in a number of ways. The water-soluble compounds such as the sodium, ammonium, triethylamine and triisopropyl amine salts may be sprayed simply as aqueous solutions. The compounds can be deposited as dusts containing a powdered carrier such as talc, Attaclay, etc. The compounds having limited water solubility, such as the acid itself and the esters, can be applied as emulsions, the same being formulated as is well known in the art, with commercially available surface active agents. Among the surface active agents utilizable are the sulfonated vegetable oils, sodium lauryl sulfate, Tween #20 (a polyalkalene ether alcohol), carbowax (polyethylene glycols of M.W. 1500 or more), Atlas G-2122 (polyoxyethylene glycol monolaurate), etc. Penetrants, sequestrants, mineral oils and cosolvents may also be included in the formulations.

Illustrative but non-limitative examples of formulations, other than straight water solutions, of the instant compounds are as follows:

EXAMPLE I

| | Parts |
|---|---|
| Methylester of 3-nitro 2,5-dichlorobenzoic acid | 1 |
| 555 oil (aromatic petroleum oil) | 2 |
| Atlas G-1255 emulsifier (polyoxyethylene sorbitol tall oil condensate) | ½ |

EXAMPLE II

| | |
|---|---|
| Ethylester of 3-nitro 2,5-dichlorobenzoic acid | 1 |
| 555 oil | 2 |
| Atlas G-1255 emulsifier | ½ |

EXAMPLE III

| | |
|---|---|
| Butyl-Cellosolve ester of 3-nitro 2,5-dichlorobenzoic acid | ½ |
| 555 oil | 2 |
| Atlas G-1255 emulsifier | 1 |

These formulations can be diluted with water in all proportions to form oil-and-water emulsions which are stable and capable of being readily sprayed on the soil or the crops and weeds.

The following tables are illustrative of the unusual selectivity of the present herbicides:

Table I 3-nitro 2,5-dichlorobenzoic acid was applied at an acid equivalent of 8 pounds per acre on the pre-emergence treatment and at 4 pounds per acre on the post-emergence treatment. The following observations were recorded four weeks after the respective treatments:

| Species | Pretreatment at 8 Pounds Per Acre | Post-treatment at 4 Pounds Per Acre |
|---|---|---|
| Corn | 1 | 0 |
| Wheat | 0 | 0 |
| Foxtail | 4 | 4 |
| Rye grass | 3 | 2 |
| Crabgrass | 4 | 3 |
| Johnson grass | 3 | 0 |
| Coffee weed | 4 | 2 |
| Mustard | 3 | 4 |
| Fire weed | 4 | 3 |
| Lambs quarter | 4 | 3 |
| Chickweed | 4 | 4 |

Activity Rating: 0—No injury; 1—No injury to questionably slight injury; 2—Moderate injury; 3—Good control; 4—Total kill.

Table II

Applications of 3-nitro 2,5-dichlorobenzoic acid and the known herbicide 2,5-dichlorobenzoic acid were made to obtain an acid equivalent of 3 and 6 pounds per acre of the respective herbicides on pre-emergence treatment. The comparative selective effects of both compounds were as follows:

| Species | 3-Nitro 2,5-Dichlorobenzoic Acid | | 2,5-Dichlorobenzoic Acid | |
|---|---|---|---|---|
| | 3 lbs./acre | 6 lbs./acre | 3 lbs./acre | 6 lbs./acre |
| Foxtail | 3 | 4 | 2 | 3 |
| Barnyard grass | 3 | 4 | 1 | 2 |
| Crabgrass | 4 | 4 | 2 | 3 |
| Johnson grass | 3 | 3 | 1 | 2 |
| Wheat | 0 | 0 | 2 | 3 |
| Soybeans | 1 | 2 | 4 | 4 |
| Carrots | 0 | 0 | 4 | 4 |
| Cabbage | 1 | 1 | 3 | 3 |

The present compounds may be applied to the soil and/or plants in varying amounts and concentrations dependent, as is well know in the art, among other things, upon soil and climatic conditions, time of application, state of growth of the useful crops and weeds, etc.

We claim:
1. A process of eradicating weeds comprising treating the locus of weed infestation with a compound selected from the class consisting of 3-nitro 2,5-dichlorobenzoic acid, its herbicidal salts, amides and esters in a concentration and amount sufficient to exert a herbicidal effect on the weeds.
2. A process of eradicating weeds comprising treating the locus of weed infestation with 3-nitro 2,5-dichloro- benzoic acid in a concentration and amount sufficient to exert a herbicidal effect on the weeds.

References Cited in the file of this patent

UNITED STATES PATENTS

| | | |
|---|---|---|
| 2,394,916 | Jones | Feb. 12, 1946 |
| 2,695,840 | Leppla | Nov. 30, 1954 |
| 2,726,947 | Baumgartner | Dec. 13, 1955 |

FOREIGN PATENTS

| | | |
|---|---|---|
| 860,639 | Germany | Dec. 22, 1952 |

OTHER REFERENCES

Zimmerman et al.: "Contrib. Boyce Thompson Inst.." January-March 1951, pages 209 to 213 incl.

Zimmerman et al.: "Contrib. Boyce Thompson Inst.," January-March 1952, page 423.

Jones et al.: "Biochemical Journal," vol. 48, No. 4, pages 422 to 425 inclusive, 1951.

Gilbert: "Chemical Reviews," October 1946, pages 199 to 211.

Hodgson et al.: "Chemical Abstracts," 1928, vol. 22, page 64(5).